(12) United States Patent
Finkelstein

(10) Patent No.: US 12,248,101 B2
(45) Date of Patent: Mar. 11, 2025

(54) METHODS AND SYSTEMS FOR INCREASING THE RANGE OF TIME-OF-FLIGHT SYSTEMS BY UNAMBIGUOUS RANGE TOGGLING

(71) Applicant: Sense Photonics, Inc., Durham, NC (US)

(72) Inventor: Hod Finkelstein, Berkeley, CA (US)

(73) Assignee: Sense Photonics, Inc., Durham, NC (US)

( * ) Notice: Subject to any disclaimer, the term of this patent is extended or adjusted under 35 U.S.C. 154(b) by 987 days.

(21) Appl. No.: 17/264,595

(22) PCT Filed: Aug. 16, 2019

(86) PCT No.: PCT/US2019/046735
§ 371 (c)(1),
(2) Date: Jan. 29, 2021

(87) PCT Pub. No.: WO2020/037167
PCT Pub. Date: Feb. 20, 2020

(65) Prior Publication Data
US 2021/0333377 A1    Oct. 28, 2021

Related U.S. Application Data

(60) Provisional application No. 62/719,182, filed on Aug. 17, 2018.

(51) Int. Cl.
*G01S 7/4915*    (2020.01)
*G01S 7/4914*    (2020.01)
(Continued)

(52) U.S. Cl.
CPC .......... *G01S 7/4915* (2013.01); *G01S 7/4914* (2013.01); *G01S 17/36* (2013.01); *G01S 17/894* (2020.01)

(58) Field of Classification Search
None
See application file for complete search history.

(56) References Cited

U.S. PATENT DOCUMENTS 8,629,976 B2    1/2014 Hui et al.
9,921,300 B2    3/2018 Galera et al.
(Continued)

FOREIGN PATENT DOCUMENTS

CN    105103006 A    11/2015
CN    107076854 A    8/2017
(Continued)

OTHER PUBLICATIONS

PCT Notification Concerning Transmittal of International Preliminary Report on Patentability (Chapter I of the Patent Cooperation Treaty), mailed on Mar. 4, 2021, for corresponding PCT International Application No. PCT/US2019/046735.
(Continued)

*Primary Examiner* — Luke D Ratcliffe
(74) *Attorney, Agent, or Firm* — Kilpatrick Townsend & Stockton LLP

(57) ABSTRACT

A method of operating a time of flight system includes detecting first optical signals comprising a first frequency having a first unambiguous range, the first optical signals reflected from a target, processing the first optical signals to determine a first estimated distance to the target, and generating an output frame comprising a true distance to the target based on the first estimated distance and a second estimated distance to the target, wherein the second estimated distance was used to generate a previous output frame.

21 Claims, 10 Drawing Sheets

(51) Int. Cl.
*G01S 17/36* (2006.01)
*G01S 17/894* (2020.01)

(56) References Cited

U.S. PATENT DOCUMENTS

| | | | |
|---|---|---|---|
| 10,483,722 B2 | 11/2019 | Burroughs et al. | |
| 2011/0285980 A1 | 11/2011 | Newbury et al. | |
| 2014/0168369 A1 | 6/2014 | Crane et al. | |
| 2014/0362364 A1 | 12/2014 | Waligorski | |
| 2016/0116594 A1* | 4/2016 | Xu | G01S 17/32 356/5.1 |
| 2017/0168369 A1* | 6/2017 | Subramanian | G02F 1/155 |
| 2017/0323429 A1 | 11/2017 | Godbaz et al. | |
| 2018/0218509 A1 | 8/2018 | Price et al. | |

FOREIGN PATENT DOCUMENTS

| | | |
|---|---|---|
| DE | 102013207651 A1 | 11/2013 |
| DE | 102012223295 A1 | 6/2014 |
| JP | 2013538342 A | 10/2013 |
| JP | 2018036145 A | 3/2018 |
| KR | 20150007192 A | 1/2015 |
| WO | 2009136149 A1 | 11/2009 |
| WO | 2012012607 A2 | 1/2012 |
| WO | 2015009220 A1 | 1/2015 |

OTHER PUBLICATIONS

Japanese Office Action corresponding to Japanese Patent Application No. 2021532277 (Foreign Text, 6 Pages, English Translation Thereof, 5 Pages) (Jul. 7, 2023).
Notification of Transmittal of the International Search Report and the Written Opinion of the International Searching Authority, or the Declaration, mailed Dec. 6, 2019 for corresponding International Application No. PCT/US2019/046735.
Section 2.3.3 of M. Heredia Conde, "Compressive Sensing for the Photonic Mixer Device", DOI 10.1007/978-3-658-18057-7_2.).
European Search Report Corresponding to European Application No. 19850372.4 (12 pages) (Feb. 11, 2022).
JP2021-532277, "Office Action", Feb. 9, 2024, 6 pages.
Murata, "Distance Image Camera (Zc-1000 Series) And Its—5—Application", Image Laboratory, vol. 21, No. 12, Dec. 10, 2010, pp. 80-86.
EP19850372.4, "Office Action", Dec. 17, 2024, 6 pages.
KR10-2021-7007114, "Office Action", Dec. 18, 2024, 16 pages.

* cited by examiner

| Frame No. | Frequencies | Estimated Distance |
|---|---|---|
| 1 | Freq1/Freq2 | D1 |
| 2 | Freq3/Freq4 | D1 |
| 3 | Freq1/Freq2 | D1 |
| 4 | Freq3/Freq4 | D1 |

| Frame No. | Frequencies | Estimated Distance |
|---|---|---|
| 1 | Freq1/Freq2 | D2-UR1 |
| 2 | Freq3/Freq4 | D2 |
| 3 | Freq1/Freq2 | D2-UR1 |
| 4 | Freq3/Freq4 | D2 |

METHODS AND SYSTEMS FOR INCREASING THE RANGE OF TIME-OF-FLIGHT SYSTEMS BY UNAMBIGUOUS RANGE TOGGLING

CROSS REFERENCE TO RELATED APPLICATION

This application is a 35 U.S.C. § 371 national stage application of PCT International Application No. PCT/US2019/046735, filed on Aug. 16, 2019, which claims priority to U.S. Provisional Patent Application No. 62/719,182, filed Aug. 17, 2018, the contents of which are incorporated herein by reference in their entireties. The above-referenced PCT International Application was published in the English language as International Publication No. WO 2020/037167 on Feb. 20, 2020.

FIELD

The present disclosure is directed to LIDAR systems, and more particularly, to methods and devices to more accurately determine a distance to a target in time-of-flight LIDAR systems.

BACKGROUND

Many emerging technologies, such as Internet-of-Things (IoT) and autonomous navigation, may involve detection and measurement of distance to objects in three-dimensional (3D) space. For example, automobiles that are capable of autonomous driving may require 3D detection and recognition for basic operation, as well as to meet safety requirements. 3D detection and recognition may also be needed for indoor navigation, for example, by industrial or household robots or toys.

Light based 3D measurements may be superior to radar (low angular accuracy, bulky) or ultra-sound (very low accuracy) in some instances. For example, a light-based 3D sensor system may include a detector (such as a photodiode or camera) and a light emitting device (such as a light emitting diode (LED) or laser diode) as a light source, which typically emits light outside of the visible wavelength range. A vertical cavity surface emitting laser (VCSEL) is one type of light emitting device that may be used in light-based sensors for measurement of distance and velocity in 3D space. Arrays of VCSELs may allow for power scaling and can provide very short pulses at higher power density.

Time of flight (ToF) based imaging is used in a number of applications including range finding, depth profiling, and 3D imaging (e.g., Light Detection And Ranging (LIDAR). ToF 3D imaging systems can be categorized as indirect ToF (iToF) or direct ToF systems.

Direct ToF measurement includes directly measuring the length of time between emitting radiation by an emitter element of a ToF system, and sensing the radiation after reflection from an object or other target (also referred to herein as an echo signal) by a detector element of the ToF system. From this length of time, the distance to the target can be estimated. Indirect time of flight measurement includes modulating the amplitude of the emitted signal and measuring phase delay or phase shift of the echo signal. The distance to the target can be calculated from the detected phase shift of the returning echo signal.

SUMMARY

Some embodiments described herein are directed to a laser diode, such as a VCSEL or other surface-emitting laser diode, an edge-emitting laser diode, and/or other semiconductor laser, and arrays incorporating the same.

According to some embodiments, a method of operating a time of flight system includes detecting first optical signals comprising a first frequency having a first unambiguous range, the first optical signals reflected from a target, processing the first optical signals to determine a first estimated distance to the target, and generating an output frame comprising a true distance to the target based on the first estimated distance and a second estimated distance to the target, wherein the second estimated distance was used to generate a previous output frame.

In some embodiments, the second estimated distance is generated by processing second optical signals comprising a second frequency having a second unambiguous range, different from the first unambiguous range.

In some embodiments, the previous output frame is generated after the processing of the second optical signals, and the first optical signals are processed after generating the previous output frame.

In some embodiments, the first optical signals are processed during a first subframe of the output frame, and the second optical signals are processed during a second subframe of the previous output frame, prior to the first subframe.

In some embodiments, determining the true distance to the target comprises adjusting the first estimated distance based on a calculated difference between the first estimated distance and the second estimated distance.

In some embodiments, the first estimated distance to the target is determined using first phase shifts in the first optical signals.

In some embodiments, the first optical signals and the second optical signals are detected by individual detector elements of a detector array.

In some embodiments, the first frequency is a combination of a plurality of frequencies, the combination of the plurality of frequencies having the first unambiguous range.

In some embodiments, the target is one of a plurality of targets, and the first estimated distance to the target is one of an array of estimated distances to the plurality of targets generated during a first subframe.

According to some embodiments, a Time of Flight (ToF) system includes a detector array that is configured to detect first optical signals comprising a first frequency having a first unambiguous range, the first optical signals reflected from a target, and a control circuit configured to process the first optical signals to determine a first estimated distance to the target, and generate an output frame comprising a true distance to the target based on the first estimated distance and a second estimated distance to the target, wherein the second estimated distance was used to generate a previous output frame.

In some embodiments, the detector array is further configured to detect second optical signals comprising a second frequency having a second unambiguous range, different from the first unambiguous range, and the control circuit is further configured to generate the second estimated distance by processing the second optical signals.

In some embodiments, the previous output frame is generated after the processing of the second optical signals, and the first optical signals are processed after generating the previous output frame.

In some embodiments, determining the true distance to the target comprises adjusting the first estimated distance based on a calculated difference between the first estimated distance and the second estimated distance.

In some embodiments, the true distance to the target is a first sum of the first estimated distance and a first multiple of the first unambiguous range and/or a second sum of the second estimated distance and a second multiple of the second unambiguous range, and, responsive to determining that subtracting the second estimated distance from the first estimated distance results in a positive number, the second multiple is calculated by the equation (TD1−TD2)/(UR2−UR1) where UR1 is the first unambiguous range, UR2 is the second unambiguous range, TD1 is the first estimated distance, and TD2 is the second estimated distance.

In some embodiments, the control circuit is further configured to determine the first estimated distance to the target using first phase shifts in the first optical signals.

In some embodiments, the first frequency is a combination of a plurality of frequencies, the combination of the plurality of frequencies having the first unambiguous range.

In some embodiments, the ToF system further includes an emitter array comprising a first plurality of emitters configured to emit the first optical signals comprising the first frequency and a second plurality of emitters configured to emit the second optical signals comprising the second frequency.

In some embodiments, the target is one of a plurality of targets, and the first estimated distance to the target is one of an array of estimated distances to the plurality of targets generated during a first subframe.

According to some embodiments, a control circuit for determining a distance to a target, the control circuit configured to perform operations including controlling transmission of first optical signals at a first modulation frequency having a first unambiguous range in a first subframe to obtain a first estimated distance to a target, and generating an output frame comprising a true distance to the target based on the first estimated distance and a second estimated distance to the target, wherein the second estimated distance was used to generate a previous output frame.

In some embodiments, the second estimated distance is generated by processing second optical signals comprising a second frequency having a second unambiguous range, different from the first unambiguous range, and determining the true distance to the target comprises comparing a calculated difference between the first estimated distance to the target and the second estimated distance to the target to a calculated difference between the first unambiguous range and the second unambiguous range.

In some embodiments, the previous output frame is generated after the processing of the second optical signals, and the first optical signals are processed after generating the previous output frame.

In some embodiments, the control circuit is further configured to determine the first estimated distance to the target based on a calculated duration between the transmission of the first optical signals and a detection of the first optical signals by a detector after being reflected by the target.

According to some embodiments, a method of operating a time of flight system includes detecting first optical signals comprising a first frequency having a first unambiguous range, the first optical signals reflected from a target, processing the first optical signals to determine a first estimated distance to the target, generating a first output frame comprising a first true distance based on the first estimated distance, detecting second optical signals comprising a second frequency having a second unambiguous range, different from the first unambiguous range, the second optical signals reflected from the target, processing the second optical signals to determine a second estimated distance to the target, and generating a second output frame comprising a second true distance based on the first estimated distance and the second estimated distance to the target.

In some embodiments, generating the second output frame comprises generating the second true distance by adjusting the second estimated distance to the target based on a comparison of the second estimated distance to the first estimated distance.

BRIEF DESCRIPTION OF THE DRAWINGS

The present invention will become more apparent in view of the attached drawings and accompanying detailed description in which the same reference numerals or the same reference designators denote the same elements throughout the specification.

DETAILED DESCRIPTION

Some embodiments of the present invention may arise from recognition that the use of alternating combinations of scanning frequencies may provide for a technical improvement in LIDAR systems that increases the precision at which a distance to a target can be determined without significantly increasing the processing time and/or physical resources used to calculate the distances.

Figure 1:
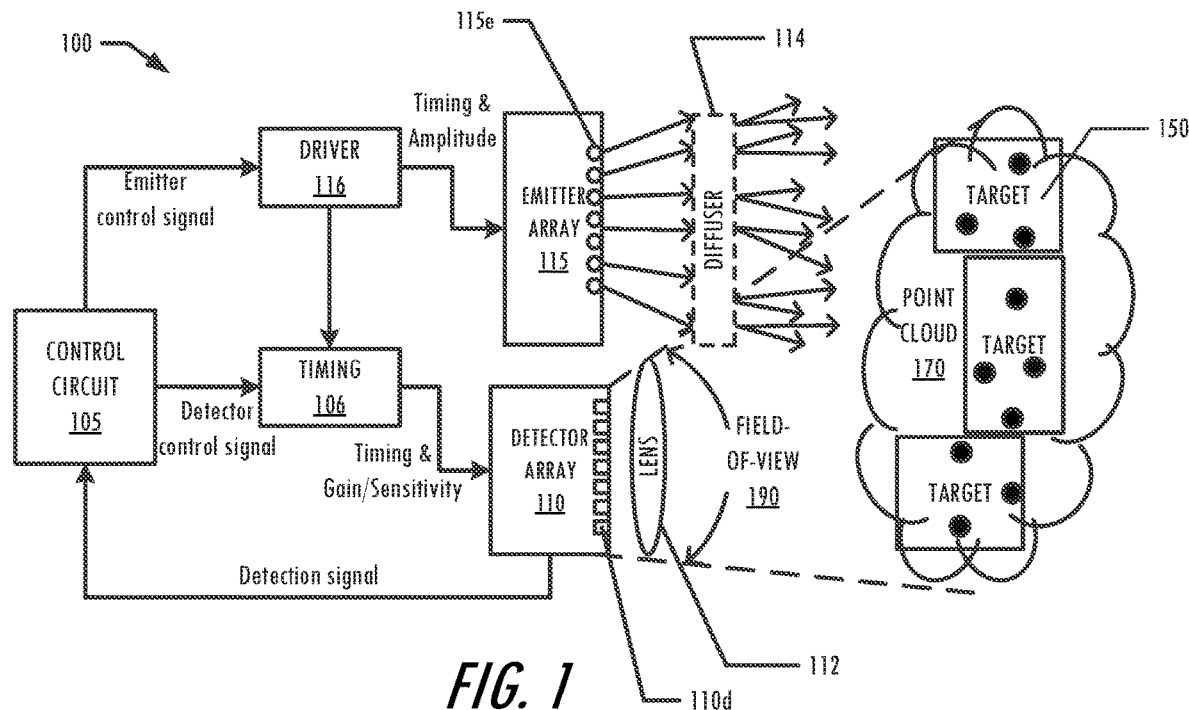
FIG. 1 illustrates an example of a flash LIDAR system or circuit according to embodiments of the present invention.

An example of a flash LIDAR system or circuit 100 that is configured to perform calculation of a distance to a target 150 in accordance with embodiments of the present invention is shown in FIG. 1. The system 100 includes a control circuit 105, a timing circuit 106, an emitter array 115 including a plurality of emitters 115e, and a detector array 110 including a plurality of detectors 110d (for example, an array of single-photon detectors). The emitter elements 115e of the emitter array 115 respectively emit a radiation pulse (for example, through a diffuser and/or optical filter 114, which may be optional) at a time controlled by a timing generator and/or driver circuit 116. In particular embodiments, the emitters 115e may be pulsed light sources, such as LEDs or lasers (such as VCSELs). Radiation is reflected back from a target 150, and is sensed by the detector array 110. The control circuit 105 implements a pixel processor that measures the time of flight of the illumination pulse over the journey from emitter array 115 to target 150 and back to detector array 110, using ToF measurement techniques, which may include direct and/or indirect measurement techniques.

The emitter array 115 includes a plurality of emitters 115e, and the detector array 110 includes a plurality of detectors 110d. In some embodiments, each of the emitter elements 115e in the emitter array 115 is connected to and controlled by a respective driver circuit 116. In other embodiments, respective groups of emitter elements 115e in the emitter array 115 (e.g., emitter elements 115e in spatial proximity to each other), may be connected to a same driver circuit 116. The driver circuit or circuitry 116 may include one or more driver transistors, which are configured to control the timing and amplitude of the optical emission signals that are output from the emitters 115e. The emission of optical signals from multiple emitters 115e provides a single image frame for the flash LIDAR system 100. The maximum optical power output of the emitters 115e may be selected to generate a signal-to-noise ratio of the echo signal from the farthest, least reflective target at the brightest background illumination conditions that can be detected in accordance with embodiments described herein. A diffuser 114 is illustrated to increase a field of view of the emitter array 115 by way of example, though the present invention is not limited thereto.

Light emission output from one or more of the emitters 115e impinges on and is reflected by one or more targets 150, and the reflected light is detected as an optical signal by one or more of the detectors 110d (e.g., via one or more lenses 112), converted into an electrical signal representation, and processed (e.g., based on time of flight) to define a 3-D point cloud representation 170 of the field of view 190. Operations of LIDAR systems in accordance with embodiments of the present invention as described herein may be performed by one or more processors or controllers, such as the control circuit 105 of FIG. 1.

In some embodiments, respective ones of the emitters 115e may emit light having a particular frequency. In some embodiments, the emitter array 115 may be configured to emit light collectively having multiple, different, frequencies. For example, a first subset of the emitters 115e may be configured to emit light having a first frequency and a second subset of the emitters 115e may be configured to emit light having a second frequency. In some embodiments, individual emitters 115e may be configured to emit light that may be selected from a plurality of frequencies. The selection of the frequency of the light emitted by the emitter array 115 based on a subset of the emitters 115e or selection of the frequency of individual emitters 115e may be under the control of the control circuit 105 and/or the driver circuit 116. Examples of methods, systems, and apparatus for producing LIDAR systems, including mechanisms to control operations of the emitters 115e are described in U.S. patent application Ser. No. 15/951,824 entitled "DEVICES WITH ULTRA-SMALL VERTICAL CAVITY SURFACE EMITTING LASER EMITTERS INCORPORATING BEAM STEERING," filed on Apr. 12, 2018, the entire contents of which are incorporated herein by reference.

In some embodiments, the detector array 110 may include a plurality of single-photon detectors 110d, such as a single photon avalanche detector (SPAD) 110d. SPAD arrays 110 may be used as solid-state detectors 110d in imaging applications where high sensitivity and timing resolution are desired. In some embodiments, respective ones of the detectors 110d may be configured to detect light having a particular frequency. In some embodiments, the detector array 110 may be configured to detect light collectively having multiple, different, frequencies. For example, a first subset of the detectors 110d may be configured to detect light having a first frequency and a second subset of the detectors 110d may be configured to detect light having a second frequency. In some embodiments, individual detectors 110d may be configured to detect light that may be selected from a plurality of frequencies.

Some LIDAR systems 100 operate by transmitting, receiving, and measuring the phase of optical signals that are modulated at multiple (e.g., two) frequencies for each pixel of a detector array 110, also known as indirect ToF (iToF). The phases may each be related to the distance of the target 150 contained in or imaged by the pixel, though they may change at different rates. However, the associated wavelengths of the frequencies used are typically shorter than the read range or imaging range, so the combination of two phases can be used to uniquely identify the distance. Indirect time of flight devices may operate by measuring phases associated with the distances of a target 150 at each pixel. These phases may be measured with a series of separate measurements, which may be measured within different subframes of an image frame. The results of these measurements produce multiple (e.g., two) vector components, the angle formed by these components is the phase.

As used herein, a subframe may be a set of one or, more samples used to generate an estimate of a distance to a target. The estimated distance may not be the true distance to the target (e.g., uncorroborated). As used herein, a frame may be a collection of subframes that are used to generate a true distance to the target (e.g., corroborated). A frame may include a collection of subframes. Frame, output frame, and image frame may be used interchangeably herein.

For example, the ToF system may generate an array of ranges (e.g., estimated distances) for one or more targets. The collection of the array of range estimates using one or more frequencies may be considered a subframe. A frame may include a collection of data from more than one subframe (e.g., each with a unique frequency or frequencies). A frame may be the unit of information which contains the reported ranges (e.g., the true distances) to one or more targets in the field of view. Though the terms "frame" and "subframe" are used herein with respect of various embodiments, those terms are not intended to limit the embodiments described herein. In some embodiments, a subframe may encompass other types of measurements, such as phase component measurements. For example, in some embodiments, a subframe may contain other subframes. In some embodiments, a frame and a subframe may encompass a substantially similar number of measurements such as, for example, when it is possible to generate a true distance directly from an estimated distance without further measurements (i.e., when there is a one-to-one correspondence between the subframe and the frame.

In embodiments described herein, unlike in previous schemes, the frame rate of a LIDAR system may be substantially equal to the subframe rate. This may allow for improved ability to address motion artifacts or to reduce system power by reducing the required emitter power since the time required to acquire all subframes may be reduced.

In an iToF system, each of the detector elements 110d of the detector array 110 may be connected to a timing circuit 106. The timing circuit 106 may be phase-locked to the driver circuitry 116 of the emitter array 115. The timing of operation and sensitivity of each of the detector elements 110d or of groups of detector elements 110d may be controlled by the timing circuit 106. The timing circuit 106 may operate respective pixels (including one or more detector elements 110d) of the detector array 110 to sample the echo signals at respective phase offsets (e.g., 90°, 180°, 270°) corresponding to the respective measurement subframes. It will be understood that the description herein with reference to four measurements of phase offsets of 0°, 90°, 180°, and 270° is by way of example only, and that embodiments of the present disclosure may utilize fewer or more component measurements for distance range calculation. As such, each of the detection signals output from the detector array 110 may include multiple component measurements sampled at different phase offsets e.g., 0°, 90°, 180°, 270°, or other phase offsets, respectively.

In some embodiments, a detector element 110d of a detector array 110 may include first and second accumulator wells, with each well being activated by the control circuit 105 or associated timing circuit 106 to detect incident photons for respective portions of each measurement subframe. Each measurement subframe may be delayed or "shifted" by a fraction of the period defined by the respective measurement frequency $f_m$ (where the period=$1/f_m$). Each subframe may thus be a measurement of a phase component that is 0, 90, 180, or 270 degrees out of phase (or offset) with respect to a reference optical signal pulse or other reference signal, with operation of the detector(s) being shifted by one-quarter of the period corresponding to the measurement frequency for each of the four subframes of an image frame.

For instance, for an optical signal emitted from the emitter array 115 at a modulation frequency of 20 MHz (and thus, a period of 50 nanoseconds (ns)), measurement of the 0° subframe may include activation of a first accumulator well of a detector 110d for time range of 0 ns to 25 ns (e.g., half of the 50 ns period), and activation of a second accumulator well of the detector 110d for time range 25 ns to 50 ns (e.g., the other half of the 50 ns period). The timing of activation of the first and second accumulator wells may each be likewise shifted or offset by 12.5 ns (e.g., one-quarter of the 50 ns period) for measurement of each subsequent subframe (e.g., 90°, 180°, 270°) of a measurement frame. For example LIDAR systems as described herein using two measurement frequencies, distance may be measured using eight subframes (i.e., four component measurements or subframes at each of the two measurement frequencies) within an image frame.

Figure 2:
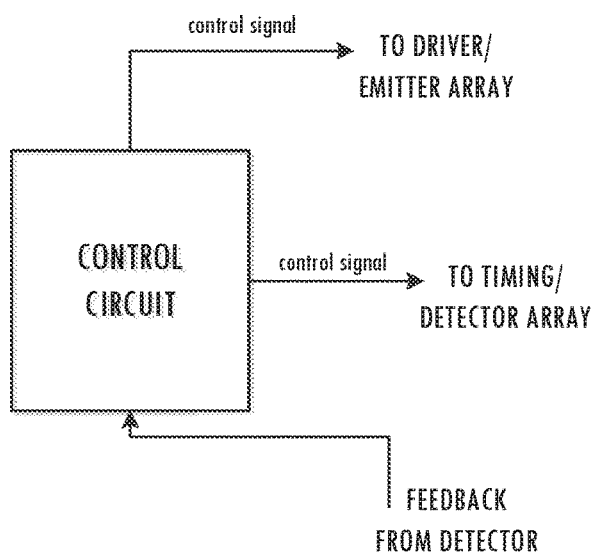
FIG. 2 illustrates the control circuit of FIG. 1 in greater detail.

FIG. 2 illustrates the control circuit 105 of FIG. 1 in greater detail. In some embodiments, the control circuit 105 may include a pixel processor that measures the phase delay or phase shift of the illumination pulse over the journey from the emitter array 115 to a target 150 and back to the detector array 110 (i.e., the difference in phase between the optical signal emitted by the emitter array 115 and the reflected optical signal or echo received at the detector array 110, as indicated by the respective detection signals output from the detector array 110) and calculates the distance to the target 150. Portions or an entirety of the control circuits described herein may be integrated in the emitter array 115 and/or detector array 110 in some embodiments.

iToF systems may operate by modulating the amplitude of electromagnetic energy. The distance to the target 150 can be calculated from the detected phase shift of the returning echo signal:

$$d = \frac{ct}{2} = \frac{\varphi}{2\pi} \frac{c}{2f_m}$$

where c is the speed of light, t is the time required for a photon to travel from the emitter 115e to the target 150 and back to the detector 110d, $y$ is the phase shift of the modulated signal and $f_m$ is the modulation frequency. Since the maximum phase is 2*pi, the unambiguous range (UR)= $c/2f_m$ for a single frequency of operation. The unambiguous range may refer to the range beyond which the phase to distance mapping rolls over and/or "wraps around" for an iToF system 100, such that targets 150 therebeyond may be calculated as having a shorter range, where phase_reported=phase_real mod (2*pi). For example, due to the repeated pulsed nature of the light, an unambiguous range of 10 meters would return a 2 meter measurement for an object that is 12 meters away.

As noted above, iToF systems 100 may illuminate a target 150 with optical signals of a particular frequency so as to determine a distance to the target based on a phase of detected light that is reflected from the target 150. The phase delay of the returning light may be measured after it has been reflected by the targets 150 in the field of view 190. The phase delay may then be measured and converted to distance, for example, using a quadrature sampling technique. Indirect ToF systems may have high frame rate due to lower computation and/or processing requirements as compared to a direct ToF system.

For example, for an optical transmission with a modulation frequency of $f_m$, the sent signal s(t) and the received signal r(t) as a function of time t with delay $\tau$ are given by:

$$s(t) = a \cos(2\pi f_m t) \qquad \text{Eqn 1}$$

$$r(t) = A \cos(2\pi f_m (t-\tau)) + B \qquad \text{Eqn 2}$$

where A and B are the unknown scale and offset of the reflected signal. For example, A is the amplitude of the received signal r(t) and may depend on the reflectivity of the target 150 and/or the sensitivity of the detector 110d. B may be due to ambient illumination associated with the operating environment. These parameters may be estimated at the emitter and/or control circuit.

The cross-correlation for s(t) and r(t) is:

$$c(x) = \lim_{T \to \infty} \int_{-T/2}^{T/2} r(t)s(t+x)dt \qquad \text{Eqn 3}$$

$$= \frac{\alpha A}{2} \cos(2\pi f_m x + 2\pi f_m \tau) + B$$

Figure 3:
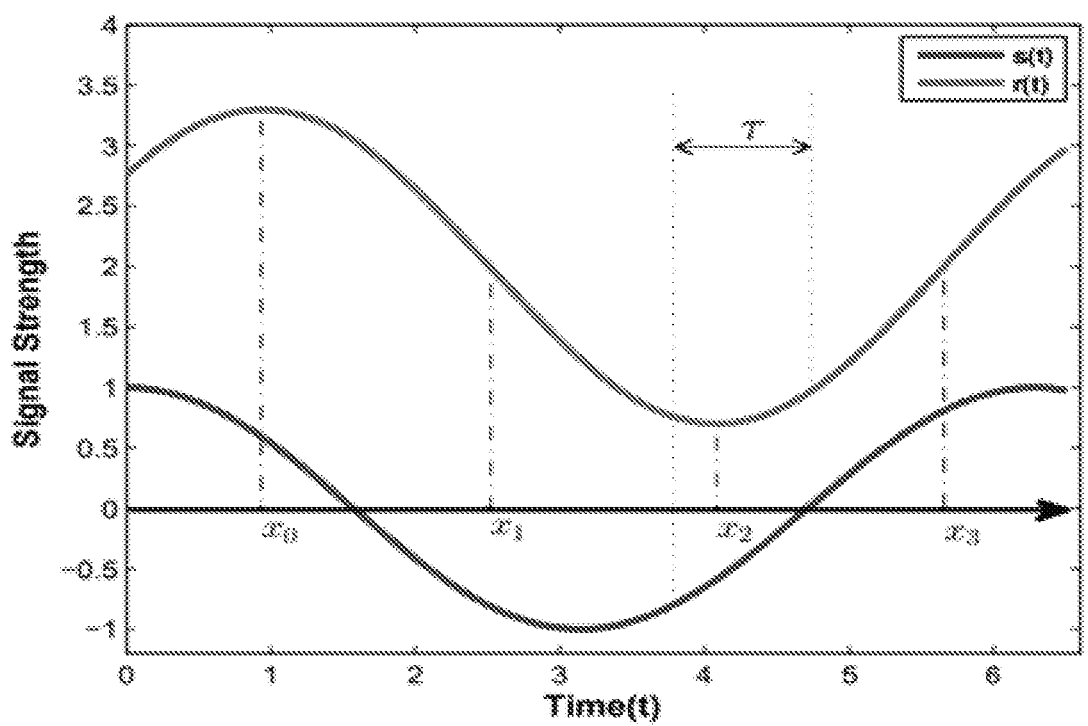
FIG. 3 is a plot of a transmitted signal and a received signal, according to some embodiments described herein.

In Equation 3, amplitude A, offset B, and delay r are unknown. These variables can be solved by a four-phase measurement method described, for example, by R. P. Horaud, "Tutorial on 3D Sensors, April 2013." In the four-phase method, four equidistant samples may be captured at locations (x0, x1, x2, x3) within a modulation cycle, which is illustrated in FIG. 3.

The cross correlations of these four outputs with the source signal s(t) is denoted by c(x0), c(x1), c(x2), c(x3). The three unknown variables can be solved based on these correlations. The amplitude A can be solved as:

$$A = \frac{\sqrt{[c(x3) - C(x1)]^2 + [c(x0) - c(x2)]^2}}{2} \qquad \text{Eqn 4}$$

The offset B may be attributed to background illumination and can be solved as $$B = \frac{c(x0) + c(x1) + c(x2) + c(x3)}{4} \quad \text{Eqn 5}$$

The delay τ is the time of flight for light sent from the emitter 115e, reflected from the surface of the target 150, and received by the detector 110d and can be solved as:

$$\tau = \arctan\left[\frac{c(x3) - c(x1)}{c(x0) - c(x2)}\right]. \quad \text{Eqn 6}$$

The value of τ is proportional to the distance d between the ToF system 100 and the illuminated target 150 as τ=2d/c, where c is the speed of light. Then the delayed phase between s(t) and r(t) can be denoted as φ=2πf$_m$ τ=2πf$_m$ (2d/c). Since φ ranges from (0, 2π], the measured distance d reaches its maximum unambiguous range when φ=2π. For an emitter 115e operating at f$_m$=15 MHz, the unambiguous range would be 10 meters.

In some embodiments, combinations of two or more modulation frequencies may be used to increase the unambiguous range. Four phase measurements may be taken for each of the multiple different modulation frequencies (e.g., for two primary measurement frequencies, eight measurements may be taken). For example, an optical system may use phase measurements taken from optical signals operating at two frequencies (e.g., approximately 18 MHz and 21 MHz). By using two frequencies, the unambiguous range may be increased to 50 meters based on the difference between the two frequencies, but with a relatively high resolution. For example, two frequencies operating at 18 MHz and 21 MHz may have a 50 meter unambiguous range, which would match the unambiguous range of a 3 MHz system. However, the system operating at operating at 18 MHz and 21 MHz would be capable of higher resolution due to the higher frequency light used as compared to the 3 MHz system.

Figure 4:
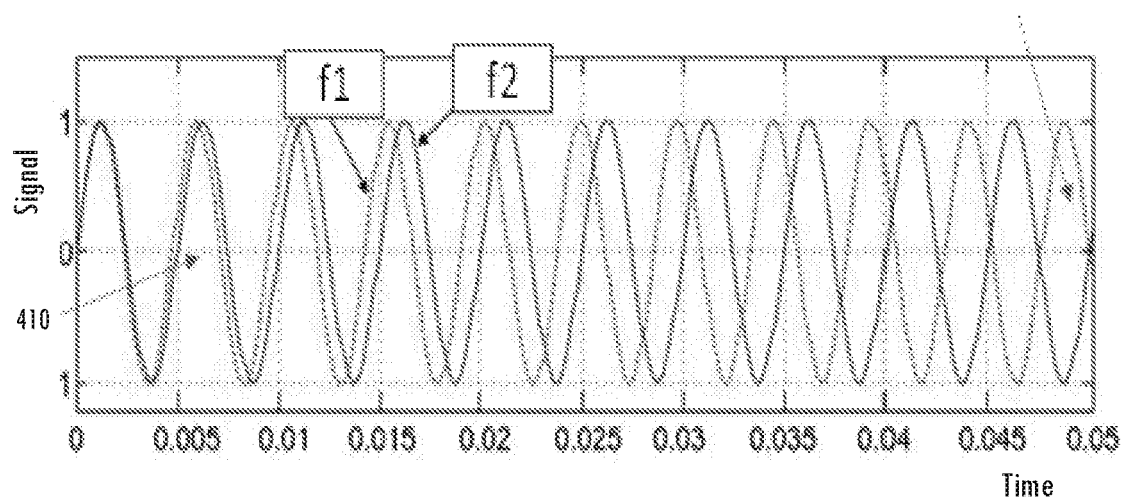
FIG. 4 is a plot of emitted light utilizing two modulated frequencies, according to some embodiments described herein.

In embodiments in which two modulation frequencies are used, two phases are detected—one for each modulation frequency. Such an example is illustrated in FIG. 4. FIG. 4 shows a plot of a signal amplitude versus time for emitted light of two modulated frequencies, f1 and f2, each having respective unambiguous ranges 410. As illustrated in FIG. 4, an unambiguous range for the combination of the frequencies f1, f2 may be increased to that of the greatest common divisor of the two frequencies f1, f2.

The frequency (or frequencies) selected for an iToF system may impact operation of the iToF system. For example, range calculation in systems using low modulation frequencies may be susceptible to phase noise. A given phase error may be translated to a larger range error if the modulation frequency is low. Therefore a trade-off may exist between using a combination of high frequencies to reduce phase noise/phase errors and using a low frequency to increase range.

Another source of error in range calculation of an iToF system may arise from an incorrect calculation of the number of integer cycles in a dual (or more than dual) frequency mode. This number of integer cycles can be calculated using several algorithms Generally speaking, the allowed combination of phase pairs (corresponding to pairs of modulated frequencies) for a given unambiguous range is known. Consequently, given a pair of detected phases (e.g., from a comparison of an echo signal from a transmitted signal), the range to the target can be estimated correctly, for example, using a lookup table. When two frequency pairs are close (e.g., have a small frequency difference, also referred to herein as a separation interval), there are more of such allowed pairs. Thus, phase errors can cause the number of integer cycles to be estimated incorrectly, resulting in large range errors. Therefore, a trade-off may exist between using two close frequencies (e.g., having a small separation interval) in order to increase the unambiguous range, versus using two frequencies that have a greater separation interval to reduce the probability of incorrect estimation of the integer number of cycles and therefore an incorrect estimation of the real range.

Some acquisition modes may use more than two frequencies in each frame in order to increase the unambiguous range. However, this may require more light energy to be output, which can be undesirable in many applications, especially if the additional frequencies are only used to resolve the unambiguous range and are not used to collect further target data. Thus, the efficiency of such a system (e.g., the amount of data returned in a given set of frames versus the power utilized in that set of frames) may be reduced.

In iToF systems, at least two measurements may be used, and in most cases three, five, nine or seventeen measurements may be used in order to acquire a single range frame (see, e.g., Section 2.3.3 of M. Heredia Conde, Compressive Sensing for the Photonic Mixer Device, DOI 10.1007/978-3-658-18057-7_2.). At least two measurements are used to calculate range. A third measurement is often conducted to characterize the passive illumination of the scene. An additional two measurements may be used to offset pixel asymmetries. In some implementations, an additional four measurements may be used to increase the unambiguous range of the system. In some implementations, the eight measurements are replicated with a different integration time in order to increase the dynamic range of the sensor. Some embodiments of the present invention describe a measurement scheme including four measurements for one unambiguous range and four measurements for a second unambiguous range, the alternating and/or toggling of which may increase the overall range of the system. Each of the four measurements are referred to herein as subframes. In some embodiments, an additional passive measurement may be included to characterize the illumination of the scene.

At least two methods have been reported for carrying out the measurements of an LIDAR system—subframe sequential and subframe concurrent. In a subframe sequential scheme (described, for example, in German Patent Publication No. DE102012223295A1 to Lange et al.), for each of the measurements, three-quarters of the optical energy is not collected and thus these systems may utilize a high-power laser and may have high power consumption, or may have limited ranges. Advantages of the subframe sequential scheme include that it uses a small area per pixel and thus large arrays can be manufactured on small dies using low-resolution and/or cheaper semiconductor technologies.

In the subframe concurrent scheme (described, for example, in U.S. Pat. No. 9,921,300 to Galera et al.), the signals collected from all of the frames and/or phases may be collected within a single laser cycle. This configuration may utilize four storage nodes as well as supporting circuitry in each pixel. Such systems may have lower laser and/or power and may be capable of achieving a longer range. However, their pixel size is larger for the same semiconductor technology node when compared with the subframe sequential scheme. This may result in either lower-resolution arrays or in more expensive sensors as compared with iToF.

In both schemes, there is a trade-off between modulation frequency and measurement error. Increasing modulation frequency improves measurement precision but reduces the unambiguous range. For this reason, a two-frequency scheme may be employed. However, as explained above, in such a scheme 7/8 of the optical energy (in the sequential subframe case) is wasted because at a given subframe of the eight subframes, only one phase of one frequency is collected. In the concurrent scheme, this ratio may go up to one-half, for example, if four phases of measurements are collected concurrently using two frequencies for one frame.

Embodiments described herein provide systems and methods to achieve a longer range while maintaining range precision and silicon utilization. This is done by alternating and/or toggling frequencies or frequency pairs and introducing a single-frame latency to the system.

As discussed herein, if an echo signal is returned from a target located beyond the unambiguous range, a range rollover error can occur. For example, if the unambiguous range of an example two-frequency system is 50 meters, a range of a target which is 55 meters away may be incorrectly calculated as being 5 meters away. Conventional mechanisms that may attempt to resolve this potential error by using lower frequencies, or combinations of frequencies, having a higher unambiguous range may be susceptible to measurement errors due to phase estimation or estimation of the integer number of cycles.

Some embodiments of the present invention make it possible to reduce or prevent roll-over errors over a workable range of a LIDAR system. Furthermore, some embodiments of the present invention can extend the unambiguous range of a LIDAR system by several times without increasing error rates that may be due to phase estimation or estimation of the integer number of cycles.

In some embodiments, in one subset of frames, a first combination of modulation frequencies having a first unambiguous range is used. In one or more other subset of frames, a second, different, combination of modulation frequencies have a second, different, unambiguous range is used. Targets within the unambiguous range of the first and second combinations of modulation frequencies in a frame will seem or may appear to be at the same target distance across the different subsets of frames. Targets outside the unambiguous range of one or more of the combination of modulation frequencies will seem or may appear to be at alternating estimated distances between different subsets of frames, with a difference between the estimated distances that is a multiple of the difference between the unambiguous ranges. By identifying those targets which seem to change estimated distances between different subsets of frames that have different frequencies in accordance with the difference in unambiguous ranges of those frequencies, the system may identify rolled-over range measurements. By calculating the difference between estimated target distances, the system may calculate the correct distance of the target.

In some embodiments, the modulation frequencies of the first combination may be separated by a first separation interval and the modulation frequencies of the second combination may be separated by a second separation interval, different than the first separation interval, though the present invention is not limited thereto.

Without loss of generality and solely for example of one implementation of the invention, a system may use a first modulation frequency pair including a first frequency and a second frequency in a first subset of frames and a second modulation frequency pair including a third frequency and a fourth frequency in a second subset of frames. The first and second frequency of the first modulation frequency pair may have a first unambiguous range UR1. The third and fourth frequency of the second modulation frequency pair may have a second unambiguous range UR2. The second unambiguous range UR2 may be different than the first unambiguous range UR1. For example, UR1 may be smaller than UR2.

For example, a system may use a modulation frequency pair of 18 MHz and 21 MHz as the first modulation frequency pair in a first subset of frames (e.g., in odd frames), and 18 MHz and 20 MHz as the second modulation frequency pair in a second subset of frames (e.g., in even frames). This combination of frequency pairs corresponds to greatest common divisors of 3 MHz and 2 MHz, respectively, with unambiguous ranges of 50 meters (UR1) for the 18 MHz/21 MHz pair and 75 meters (UR2) for the 18 MHz/20 MHz pair. As illustrated by this example, in some embodiments, ones of the first frequency or the second frequency of the first modulation frequency pair may be the same as ones of the third frequency or the fourth frequency of the second modulation frequency pair.

Figure 5A:
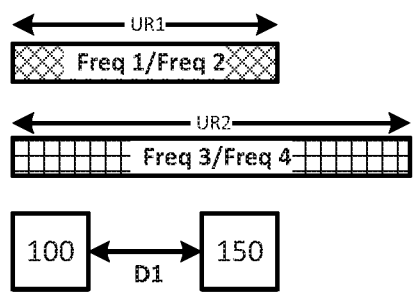
FIGS. 5A-5E are schematic diagrams of examples of calculating a target distance using a plurality of frequency combinations, according to some embodiments described herein.

FIG. 5A illustrates an example in which a target 150 is a distance D1 from the LIDAR system 100 that is less than both the first and second unambiguous ranges, UR1, UR2 of respective first and second modulation frequency pairs, according to embodiments of the present invention. In this case, the estimated distance that is calculated based on the first modulation frequency pair will be D1 (e.g., the actual distance to target 150) and the estimated distance that is calculated by the second modulation frequency pair will also be D1. In one example, a target 150 is at an actual 20 meter distance (D1), and will be measured correctly in both frames that use the 18/21 MHz modulation frequencies and the frames that use the 18/20 MHz modulation frequencies. In other words, the distance D1 to the target 150 will be measured correctly in both frames. In this scenario, a difference between the estimated distances returned by the two combinations of frequencies will be zero (e.g., D1 (as calculated based on the first modulation frequency pair)–D1 (as calculated based on the second modulation frequency pair)=0).

Figure 5B:
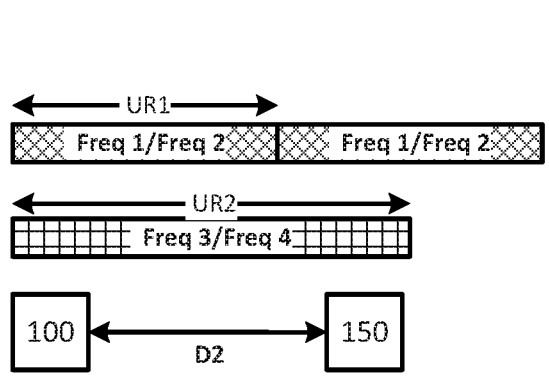

FIG. 5B illustrates an example in which a target 150 is a distance D2 from the LIDAR system 100 that is greater than the first unambiguous range UR1 of the first modulation frequency pair but less than the second unambiguous range UR2 of the second modulation frequency pair, according to embodiments of the present invention. In this case, the estimated distance calculated based on the first modulation frequency pair will be D2–UR1 due to "rollover" of the first unambiguous range UR1 and the estimated distance calculated based on the second modulation frequency pair will be D2, because D2 is within the second unambiguous range UR2 of the second modulation frequency pair. In this scenario, a difference between the estimated distances will be UR1. (e.g., (D2–UR1)–D2=–UR1). In one example, the target 150 is at 60 meters and the LIDAR system 100 utilizes a first pair of modulation frequencies having a 50 meter unambiguous range UR1 and a second pair of modulation frequencies having a 75 meter unambiguous range UR2. In frames utilizing the first modulation frequency pair (e.g., the odd frames), the target 150 would be estimated to be at a distance of 10 meters and in frames utilizing the second modulation frequency pair (e.g., the even frames) the target 150 would be estimated to be at a distance of 60 meters. The difference between the two estimated distances is 50 meters, which is equal to the unambiguous range of the first modulation frequency pair. A processing unit will calculate the true range of the target 150 as 60 meters, as will be discussed further herein.

Figure 5C:
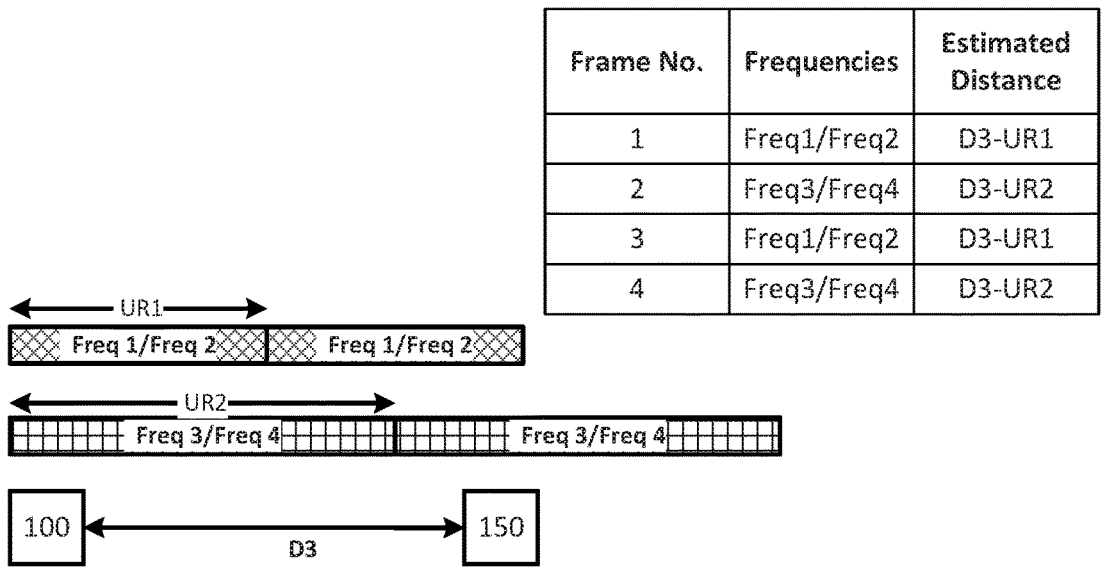

FIG. 5C illustrates an example in which a target 150 is a distance D3 from the LIDAR system 100 that is beyond both the first and second unambiguous ranges, UR1, UR2 of respective first and second modulation frequency pairs, according to embodiments of the present invention. In this case, the estimated distance calculated based on the first modulation frequency pair will be D3−UR1 due to rollover of the first unambiguous range UR1 and the estimated distance calculated based on the second modulation frequency pair will be D3−UR2 due to rollover of the second unambiguous range UR2. In this scenario, a difference between the estimated distances will be UR2−UR1. (e.g., (D3−UR1)−(D3−UR2)=UR2−UR1). An example of this scenario includes when the target 150 is at 90 meters and the LIDAR system 100 utilizes a first pair of modulation frequencies having a 50 meter unambiguous range UR1 and a second pair of modulation frequencies having a 75 meter unambiguous range UR2. In frames utilizing the first modulation frequency pair (e.g., the odd frames), the target 150 would appear to be at a distance of 40 meters while in frames utilizing the second modulation frequency pair (e.g., the even frames) the target 150 would appear to be at a distance of 15 meters. The system will therefore calculate the true distance of the target 150 to be 90 meters. Note that in this example the difference in measured ranges was 25 meters, which is the difference between unambiguous ranges of the two modulation frequency pairs.

Figure 5D:
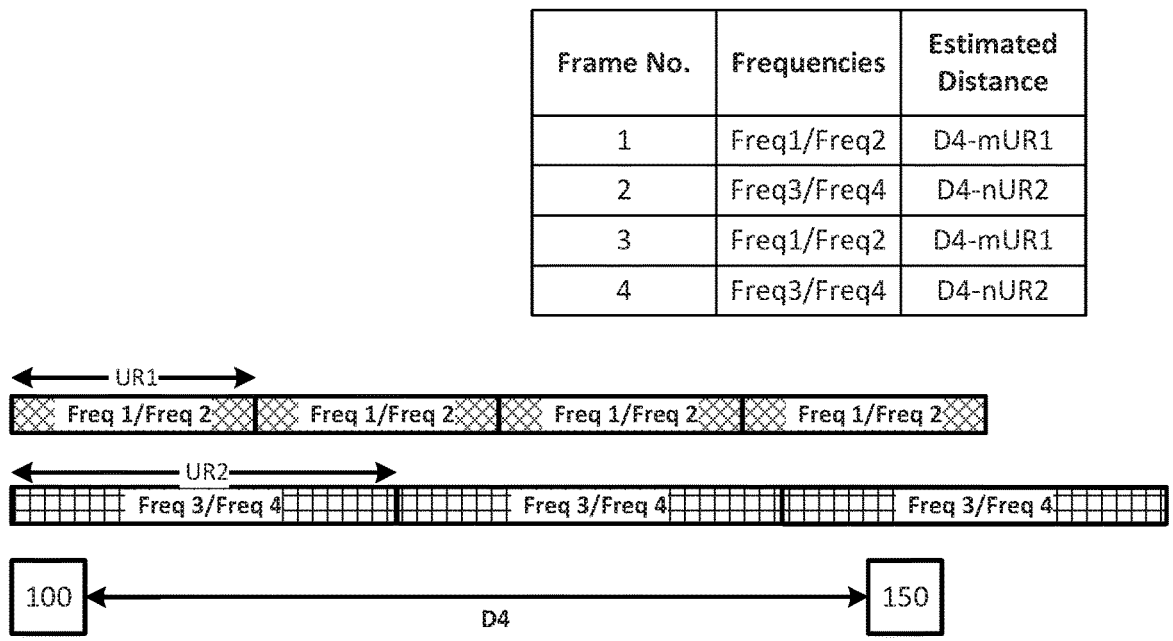

FIG. 5D illustrates an example in which a target 150 is a distance D4 from the LIDAR system 100 that is two or more times (e.g., m times, where m is a natural number) greater than the first unambiguous range UR1 of the first modulation frequency pair and two or more times (e.g., n times, where n is a natural number) greater than the second unambiguous range UR2 of the second modulation frequency pair, according to embodiments of the present invention. In this case, the estimated distance calculated based on the first modulation frequency pair will be D4−mUR1 due to rollover of the first unambiguous range UR1 and the estimated distance calculated based on the second modulation frequency pair will be D4−nUR2 due to rollover of the second unambiguous range UR2. In this scenario, a difference between the estimated distances will be nUR2−mUR1. (e.g., (D4−mUR1)−(D4−nUR2)=nUR2−mUR1).

Figure 5E:
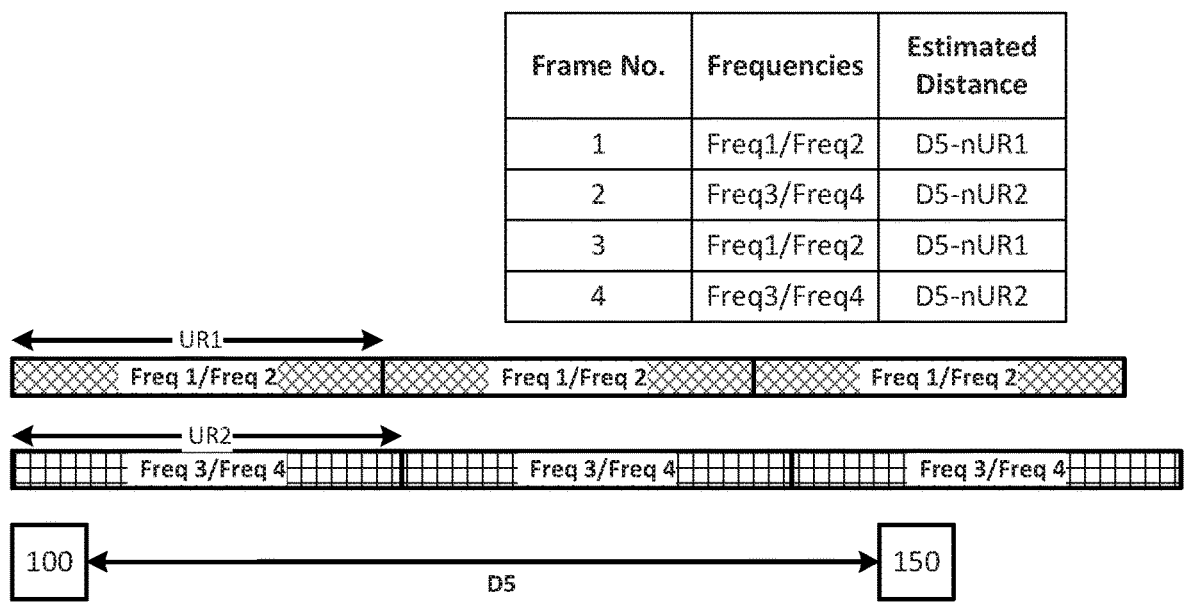

Of note, if m=n, then the difference between the two estimated distances will be n(UR1−UR2), or a multiple of the difference between the two unambiguous ranges. Stated another way, when a first quotient of the target distance (e.g., D4) divided by the first unambiguous range UR1 equals a second quotient of the target distance (e.g., D4) divided by the second unambiguous range UR2, a difference between the two estimated distances will be a multiple of the difference between the two unambiguous ranges. FIG. 5E illustrates an example in which a target 150 is a distance D5 from the LIDAR system 100, with m equal to n, according to embodiments of the present invention. In other words, the target 150 is at a distance D5 such that the first modulation frequency pair and the second frequency pair rollover the same number of times. In this case, the first modulation frequency pair will generate an estimated distance of D5−nUR1 and the second modulation frequency pair will generate an estimated distance of D5−nUR2. A difference between the two estimated distances is (D5−nUR1)−(D5−nUR2)=n(UR1−UR2).

In an example embodiment, a first modulation frequency pair with a first unambiguous range UR1 of 50 meters (e.g., a frequency pair of 18 MHz/21 MHz) and a second modulation frequency pair with a second unambiguous range UR2 of 51 meters is used (e.g., a frequency pair of 17.64 MHz/20.58 MHz). If a target is 110 meters away, the frames in which the first modulation frequency pair are used (e.g., the odd frames) will determine a distance of 10 meters and the frames in which the second modulation frequency pair are used (e.g., the even frames) will determine a distance of 8 meters. The difference between the estimated distances is 2 (e.g., 10−8), which is two times the difference between the first and second unambiguous ranges UR1, UR2. Therefore the system calculates a true distance of 2×50+10 which is 2×51+8=110 meters.

An additional scenario of note is when m is one more than n, e.g., m=n+1. In this case, one of the modulation frequency pairs has rolled over one more time than the other modulation frequency pair. FIG. 5D illustrates such an example. As previously noted, the first modulation frequency pair may generate an estimated distance, TD1, of D4−mUR1 and the second modulation frequency pair may generate an estimated distance, TD2, of D4−nUR2. Thus, the actual distance to the target D4, is mUR1+TD1 or nUR1+TD2. However, when one assumes that m=n+1, then the distance D4 is (n+1)UR1+TD1 or nUR2+TD2. Setting these two distances equal, and solving for n, leads to the equation:

$$n=(UR1+(TD1-TD2))/(UR2-UR1)$$

FIG. 5B illustrates an example where m=1 and n=0 (e.g., only the first modulation frequency pairs has rolled over). When a target distance is beyond some first multiple of the unambiguous range (e.g., UR1) of one of the modulation frequency pairs and is beyond some second multiple of the unambiguous range (e.g., UR2) of the other modulation frequency pair, a difference between the estimated distances (e.g., TD1−TD2) will be negative. Thus, the condition where m=n+1 may be detected by examining a difference between the estimated target distances.

For example, a first modulation frequency pair with a first unambiguous range UR1 of 50 meters (e.g., a frequency pair of 18 MHz/21 MHz) and a second modulation frequency pair with a second unambiguous range UR2 of 51 meters is used (e.g., a frequency pair of 17.64 MHz/20.58 MHz). If a target is 101 meters away, the frames in which the first modulation frequency pair are used (e.g., the odd frames) will determine a distance of 1 meter and the frames in which the second modulation frequency pair are used (e.g., the even frames) will determine a distance of 50 meters. The difference between the estimated distances is −49 (e.g., 1−50). Since the number is negative, the equation identified above can be used to solve for n, which is n=(50−49)/(1)=1. Therefore the system calculates a true distance of ((1+1)×50+1 which is 1×51+50=101 meters.

In embodiments in which m and n can be any number, it may be difficult, without additional data, to determine the true distance of the target 150. However, because LIDAR systems are not designed to be operated with infinite potential distance, it may be possible to select frequencies which may be realistically used in a practical LIDAR system without regard for theoretical limitations such as farther distances. For example, the distance over which the LIDAR system is intended to operate may be limited by the power used in the emitters as well as a design goal of supporting a limited area of analysis. For example, for a LIDAR system designed for a car or other vehicle, discerning targets within 200 meters may be sufficient. Thus, the inventors have recognized that it is possible to select realistic frequency pairings having unambiguous ranges within a farthest supported target distance such that the m=n or m=(n−1) over the farthest supported target distance of the LIDAR system. Stated another way, for a distance Tmax that represents the farthest distance over which a LIDAR should be capable of detecting a target, embodiments of the present invention select groups of frequencies such that a first quotient of the distance Tmax divided by the first unambiguous range UR1 of a first group of the frequencies equals, or is within one of, a second quotient of the distance Tmax divided by the second unambiguous range UR2 of a second group of the frequencies over the entire distance Tmax.

For example, for a system configured to have a Tmax of 200 meters, two pairs of frequencies can be selected such that a quotient of 200 meters divided by the unambiguous range of the first pair of frequencies is equal to, or within one of, a second quotient of 200 meters divided by the unambiguous range of the second pair of frequencies. For example, a first pair of frequencies may have an unambiguous range of 40 meters and a second pair of frequencies may have an unambiguous range of 43 meters. The quotient of 200 meters divided by 40 meters is 5, and the quotient of 200 meters divided by 43 meters is 4. A first pair of modulation frequencies may be selected that have an unambiguous range of 40 meters and a second pair of modulation frequencies may be selected that have an unambiguous range of 43 meters. In some embodiments, the two unambiguous ranges may be selected so that they do not have a common factor within the operating range of the system.

In such a system, as discussed herein, a difference between the estimated distances of two pairs of frequencies taken within different frames can be examined. In some embodiments, the difference between the estimated distances may be calculated by subtracting a second estimated distance of a second pair of frequencies having a second unambiguous range from a first estimated distance of a first pair of frequencies having a first unambiguous range, smaller than the second unambiguous range.

If a difference between the two estimated distances is zero, then both estimated distances may be the true distance to the target. If a difference between the two estimated distances is positive, then the multiple for the two estimated distances (e.g., m or n, the number of times the unambiguous ranges have rolled over) may be found by dividing the difference between the two estimated distances by an absolute value of the difference between the two unambiguous ranges (e.g., UR2−UR1). The true distance to the target will be the multiple times the unambiguous range plus the estimated distance.

If a difference between the two estimated distances is negative, then the multiple for the pair of modulation frequencies having the larger unambiguous range (e.g., the second pair of frequencies) may be found by the equation:

$$n=(UR1+(TD1-TD2))/(UR2-UR1)$$

where UR1 is the first unambiguous range of the first pair of frequencies, UR2 is the second unambiguous range of the second pair of frequencies, and (TD1−TD2) is the difference between the two estimated distances. Once n has been calculated, m=n+1. The true distance to the target will be the respective multiple times the unambiguous range plus the estimated distance. For example, for the first pair of modulation frequencies, the true distance will be m(UR1)+TD1 and/or or the second pair of modulation frequencies, the true distance will be n(UR2)+TD2. As illustrated in FIGS. 5A to 5E, a true distance to a target may be determined within a frame based on measurements and/or subframes taken in previous frames.

Figure 6:
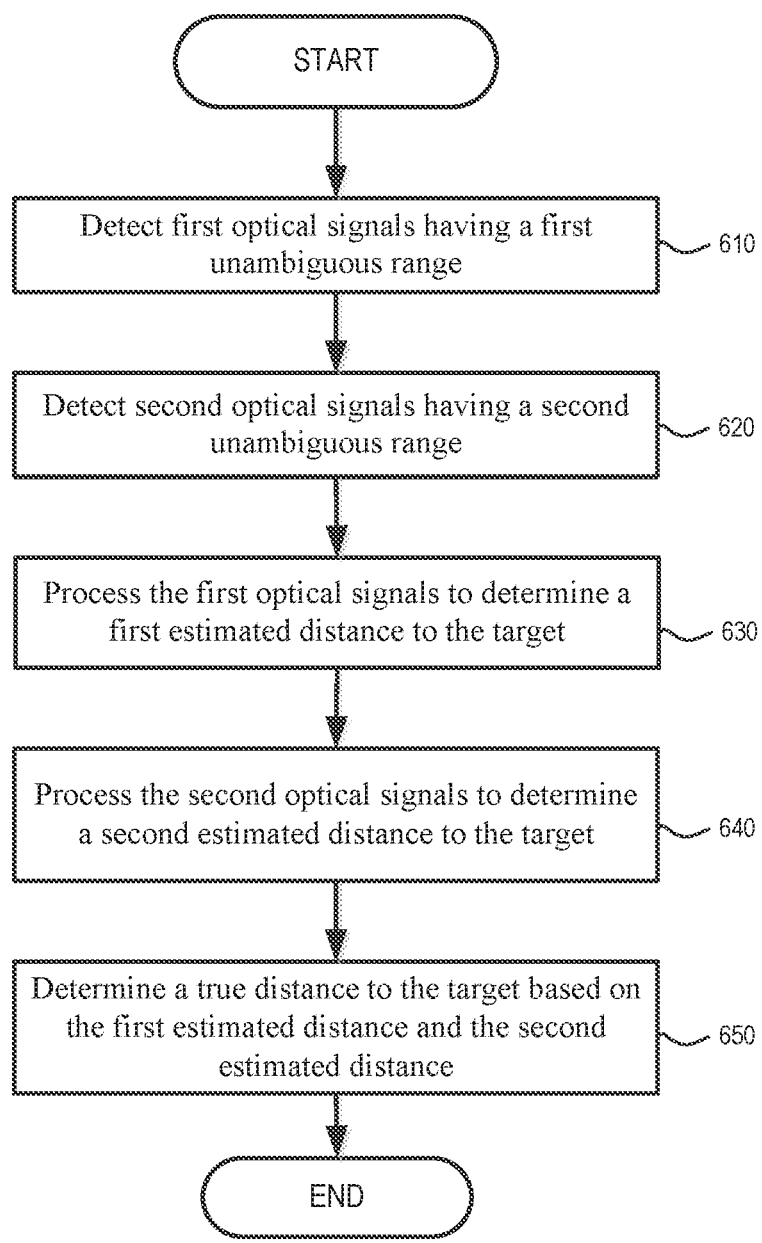
FIG. 6 illustrates a method of operating a time of flight system, according to some embodiments described herein.

FIG. 6 illustrates a method of operating a time of flight system, according to some embodiments described herein. As illustrated in FIG. 6, the method may include block 610 that includes detecting a first subset of optical signals comprising a first frequency having a first unambiguous range. In some embodiments, the first subset of optical signals may be emitted by emitters 115e, reflected from a target 150, and detected by detectors 110d of a detector array 110 of a LIDAR system 100, such as that illustrated in FIG. 1. In some embodiments, the first frequency may comprise a plurality of frequencies and the first unambiguous range may be based on the plurality of frequencies. In some embodiments, the first subset of optical signals may be detected during a first subframe.

The operations may continue with block 620 that includes detecting a second subset of optical signals comprising a second frequency having a second unambiguous range. In some embodiments, the second subset of optical signals may be emitted by emitters 115e, reflected from a target 150, and detected by detectors 110d of a detector array 110 of a LIDAR system 100, such as that illustrated in FIG. 1. In some embodiments, the second frequency may comprise a plurality of frequencies and the second unambiguous range may be based on the plurality of frequencies. In some embodiments, the first subset of optical signals may be detected in a first subframe and the second subset of optical signals may be detected in a second subframe.

The operations may continue with block 630 that includes processing the first subset of optical signals to determine a first estimated distance to the target. In some embodiments, processing the first subset of optical signals may include detecting first phase shifts in the first subset of optical signals and determining the first estimated distance to the target may be based on the detected first phase shifts.

The operations may continue with block 640 that includes processing the second subset of optical signals to determine a second estimated distance to the target. In some embodiments, processing the second subset of optical signals may include detecting second phase shifts in the second subset of optical signals and determining the second estimated distance to the target may be based on the detected second phase shifts.

The operations may continue with block 650 that includes determining a true distance to the target based on a difference between the first estimated distance and the second estimated distance. The true distance may be output as part of a frame of the ToF system. Determining the true distance may be performed by operations such as those discussed herein with respect to FIGS. 5A-5E.

Though the embodiments described herein include descriptions of mathematical equations, it will be understood that the present invention is not limited to calculation of the true distance using these equations. In some embodiments, a lookup table may be used to determine the true distance based on the first and second estimated distances. In some embodiments, other equations (and or lookup tables) may be used based on other input values, such as noise estimates or other data that may influence determination of the true distance. In some embodiments, a table of possible measured range combinations vs real ranges is numerically generated. In a system with N frequencies per frame, for each measured subframe of any of the N frequencies, the values of the measured estimated distances of the previous N subframes may be used to look in the table of possible measured range combinations in order to determine the most likely true distance. In some embodiments, suitable statistical algorithms, such as maximum likelihood, may be used to determine the most likely true distance in the presence of measurement noise, such as phase noise, in the measured estimated distances.

Embodiments of the present invention may utilize methods for determining the true distance to the target based on a first estimated distance reported by a first frequency and a second estimated distance reported by a second frequency to further improve a LIDAR system.

By alternating the frequency used in subframes of sequential frames of the LIDAR system (e.g., a first subframe of a first frame utilizing a first frequency and a second subframe of a second, subsequent, frame utilizing a second frequency), the estimated distance from the first, prior, frame may be used to correct the estimated distance from the second, subsequent, frame. Stated another way, an output frame including the true distance to the target may be generated based on adjusting the estimated distance determined in the second subframe based on the estimated distance from the first subframe of the prior frame. This may allow for a system having high precision with respect to distance estimation while maintaining a high frame rate at a lower energy output.

Figure 7:
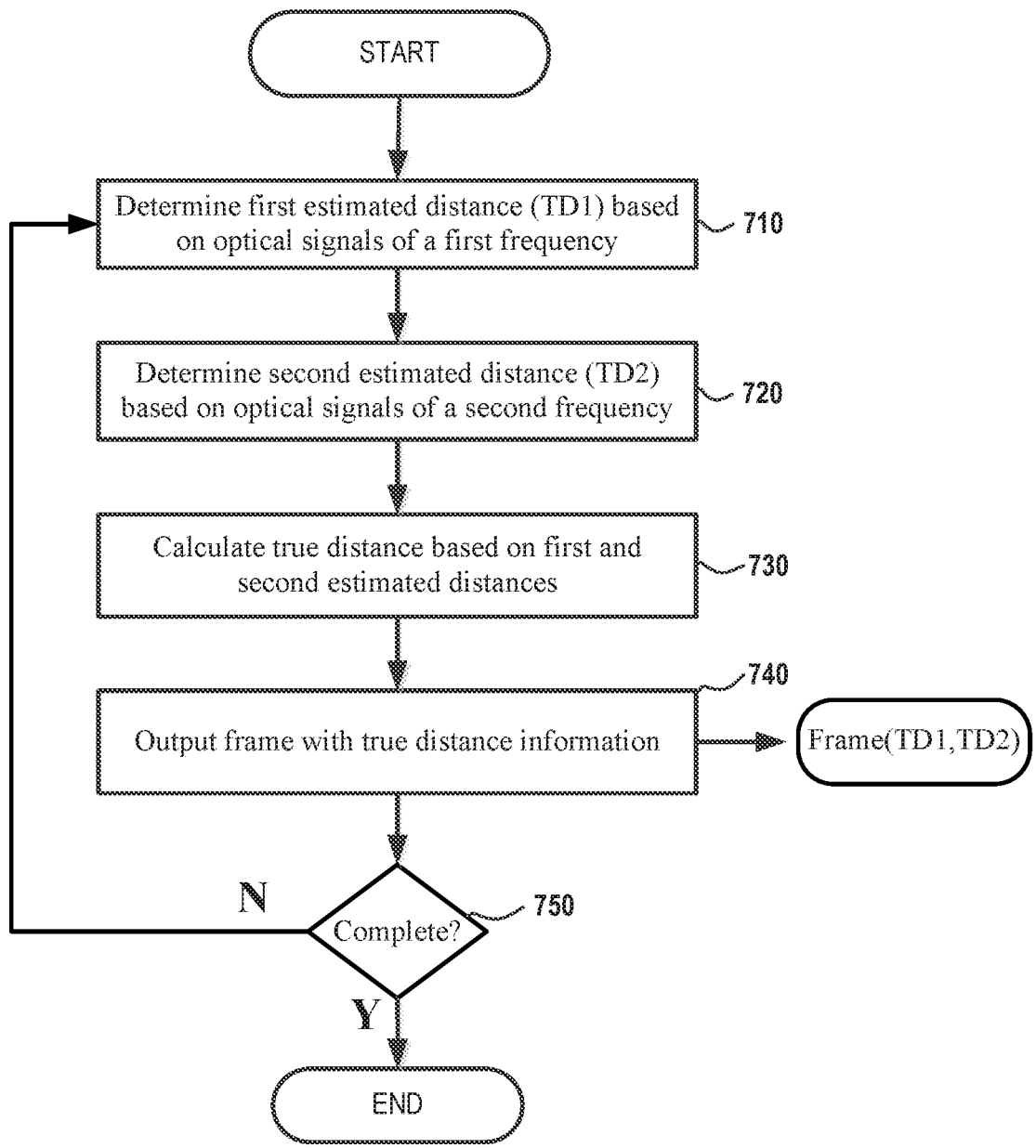
FIG. 7 is a flowchart that illustrates an algorithm for calculating a true distance to a target based on two subframes taken at two different frequencies to generate an output frame.
Figure 8:
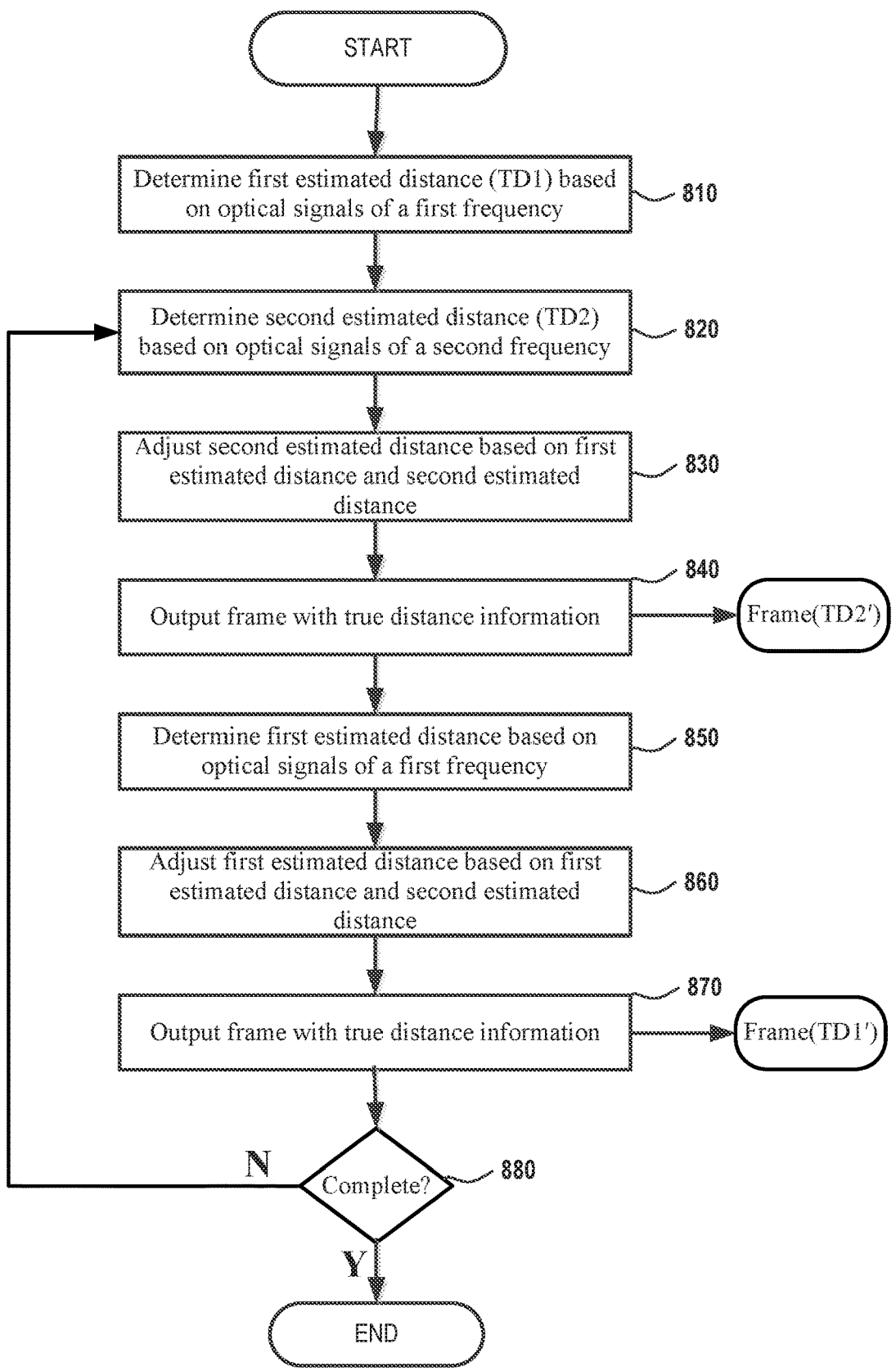
FIG. 8 is a flowchart that illustrates an improved algorithm according to embodiments described herein that calculates a true distance to a target by adjusting an estimated distance based on a subframe of a prior frame.

FIGS. 7 and 8 are flowcharts that illustrate a comparison between two iToF systems that highlight benefits of the present invention. FIG. 7 is a flowchart that illustrates an algorithm for calculating a true distance to a target based on two subframes taken at two different frequencies to generate an output frame. FIG. 8 is a flowchart that illustrates an improved algorithm according to embodiments described herein that calculates a true distance to a target by adjusting an estimated distance based on a subframe of a prior frame.

Referring to FIG. 7, a system that determines a true distance to a target based on two subframes taken at two different frequencies may begin at operation 710 in which a first estimated distance (e.g., TD1) may be calculated based on optical signals of a first frequency in a first subframe. The first frequency may have a first unambiguous range. Though the following discussion may refer to a first frequency and a second frequency, it will be understood that in some embodiments, the first and/or the second frequency may respectively be a plurality of frequencies.

The operations may continue with operation 720 in which a second estimated distance (e.g., TD2) may be calculated based on optical signals of a second frequency in a second subframe. The second frequency may have a second unambiguous range, different from the first unambiguous range.

The operations may continue with operation 730 in which a true distance to the target may be calculated based on both of the first and second estimated distances. This true distance may be based on a relationship between the first frequency and the second frequency, as well as the first and second estimated distances.

The operations may continue with operation 740 in which an output frame including the true distance to the target based on the first and second estimated distances from the two subframes (e.g., Frame(TD1, TD2)) is output to the LIDAR system. As illustrated in FIG. 7, to output the frame, the system processes two subframes of optical signals (at the first and second frequencies) and calculates two estimated distances. For example, a plurality of subframes of optical signals may have been sampled in each frame to capture one or more phase offsets of the optical signals.

After the output frame is released, the operations may continue with operation 750 in which it is determined whether processing is complete. If complete, the system exits. If not complete, the frame processing continues with operation 710, in which the first estimated distance is calculated again. The method will continue, with each operation utilizing two subframes (each from potentially including a plurality of subframes) utilizing two frequencies to generate the output frame.

Referring to FIG. 8, a contrasting system that takes advantage of techniques described herein may begin at operation 810 in which a first estimated distance (e.g., TD1) may be calculated based on a sampled subframe (e.g., a capture subframe) of optical signals of a first frequency. The first frequency may have a first unambiguous range. In some embodiments, the capture subframe may include a plurality of subframes in which optical signals have been sampled to capture one or more phase offsets of the optical signals.

The operations may continue with operation 820 in which the modulation frequency is toggled and a second estimated distance (e.g., TD2) may be calculated based on a sampled subframe (e.g., a capture subframe) of optical signals of a second frequency. The second frequency may have a second unambiguous range, different from the first unambiguous range.

The operations may continue with operation 830 in which a true distance to the target may be calculated by adjusting the second estimated distance TD2 utilizing techniques described herein. For example, based on a difference between the first estimated distance TD1 of the prior subframe and the second estimated distance TD2, a true distance to the target may be determined. For example, the difference between the first estimated distance TD1 and the second estimated distance TD2 may indicate that a rollover has occurred with respect to the second estimated distance TD2. Methods for determining the true distance to the target and/or whether a rollover has occurred are discussed herein with respect to FIGS. 5A-5E. For example, a multiple of how many times the second estimated distance TD2 has rolled over based on its second unambiguous range may be determined. The second estimated distance TD2 may be adjusted to create an adjusted second estimated distance TD2' based on the difference between the first estimated distance TD1 and the second estimated distance TD2.

Using an example that was discussed previously, a first modulation frequency pair with a first unambiguous range UR1 of 50 meters (e.g., a frequency pair of 18 MHz/21 MHz) and a second modulation frequency pair with a second unambiguous range UR2 of 51 meters may be used (e.g., a frequency pair of 17.64 MHz/20.58 MHz). Given these unambiguous ranges, the first measurements using the first frequency pair may determine a first estimated distance TD1 of 1 meter, and the second measurements using the second frequency pair may determine a second estimated distance TD2 of 50 meters. Using some embodiments described herein, the system may determine that the difference between the two estimated distances indicates that the measurement using the second frequency pair has rolled over one time (e.g., through calculation of the multiple n). Therefore, the system may calculate an adjusted second estimated distance TD2' of 1×51+51=101 meters.

Though the examples discussed herein describe the use of mathematical equations and/or other analysis to adjust the estimated distances, it will be understood that the embodiments described herein are not limited to these operations. In some embodiments, the second estimated distance may be adjusted based on a lookup table, for example, in which the first estimated distance and the second estimated distance are inputs.

The operations may continue with operation 840 in which an output frame including the true distance based on the adjusted second estimated distance (e.g., Frame(TD2')) is output to the LIDAR system.

The operations may continue with operation 850, in which the frequency is toggled and a first estimated distance TD1 is again calculated in a subframe based on optical signals of the first frequency. This may be similar to operation 810, described herein. However, unlike operation 810, the system now has a prior estimated distance (TD2) with which to compare the determined first estimated distance TD1. Thus, in operation 860, a true distance to the target may be calculated by adjusting the first estimated distance TD1 utilizing techniques described herein based on the second estimated distance calculated in the prior output frame (e.g., Frame(TD2')). For example, based on a difference between the first estimated distance TD1 and the second estimated distance TD2 from the prior frame, a true distance to the target may be determined. For example, the difference between the first estimated distance TD1 and the second estimated distance TD2 may indicate that a rollover has occurred with respect to the first estimated distance TD1. Methods for determining the true distance to the target and/or whether a rollover has occurred are discussed herein with respect to FIGS. 5A-5E. For example, a multiple of how many times the first estimated distance TD1 has rolled over may be determined. The first estimated distance TD1 may be adjusted to an adjusted first estimated distance TD1' based on the difference between the first estimated distance TD1 and the second estimated distance TD2.

Using the earlier example of a first modulation frequency pair having a first unambiguous range UR1 of 50 meters, a second modulation frequency pair having a second unambiguous range UR2 of 51 meters, and first and second estimated distances of 1 meter and 50 meters respectively, the system may determine that the difference between the two estimated distances indicates that the measurement using the first frequency pair has rolled over twice (e.g., through calculation of the multiple m). Therefore, the system may calculate an adjusted first estimated distance TD1' of 2×50+1=101 meters.

The operations may continue with operation 870 in which an output frame including the true distance based on the adjusted first estimated distance (e.g., Frame(TD1')) is output to the LIDAR system.

Thus, FIG. 8 illustrates an embodiment in which the LIDAR system detects first optical signals including a first frequency having a first unambiguous range that are reflected from a target, processes the first optical signals to determine a first estimated distance to the target, and generates an output frame comprising a true distance to the target based on the first estimated distance and a second estimated distance to the target that was used to generate a previous output frame.

By comparison of a timing of the output frames (e.g., Frame(TD1') and Frame(TD2')) a difference between the system of FIG. 8 and the system of FIG. 7 can be seen. The system of FIG. 8 is capable of outputting an output frame after every measurement (e.g., every capture subframe) made by the first frequency or the second frequency. The system of FIG. 7 utilizes two measurements (e.g., two capture subframes) for every output frame. In embodiments described herein, even if optical signals from N frequencies are sequentially collected during capture subframes, the update or frame rate of the LIDAR system may be determined by the collection time of each frequency and not by the collection time of all N frequencies (as in FIG. 7). The system of FIG. 8 illustrates an improvement over the system of FIG. 7 for several reasons.

Figure 9:
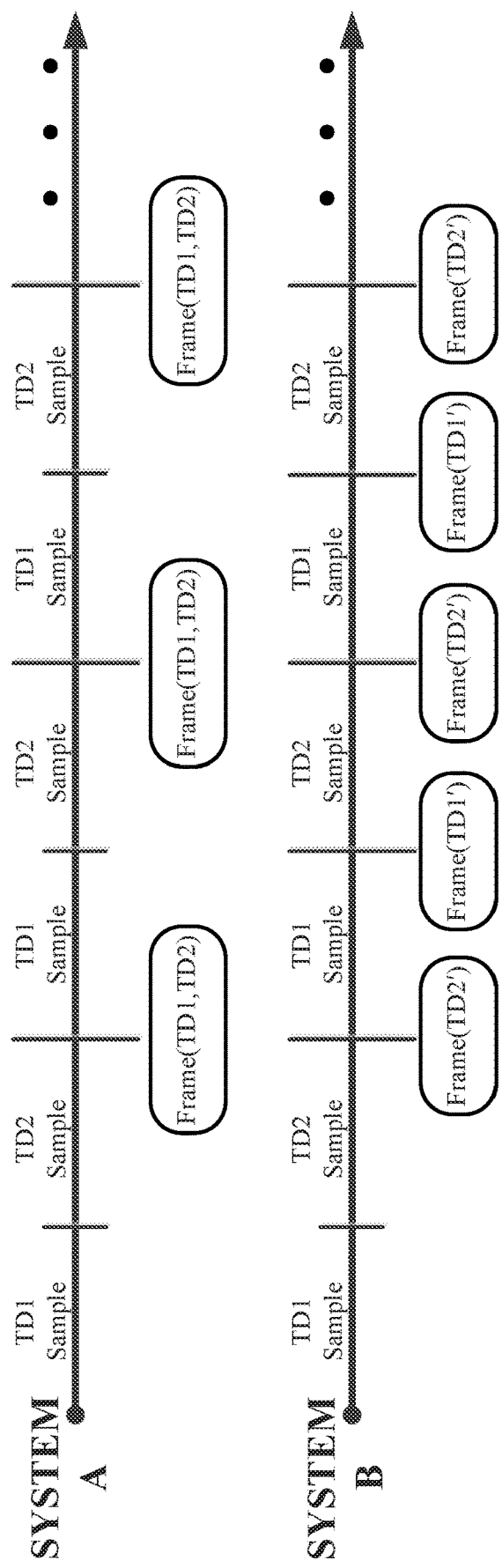
FIG. 9 illustrates a comparison of output frames utilizing embodiments described herein.

For example, for approximately the same number of capture subframes (e.g., samples of the optical signals to determine an estimated distance), the system of FIG. 8 is capable of outputting approximately twice as many output frames. (The system of FIG. 8 does have an initial capture subframe that does not correspond to an output frame, but subsequent capture subframes may correspond to output frames in a one-to-one fashion.) FIG. 9 illustrates a comparison of output frames utilizing embodiments described herein. FIG. 9 is not intended to be to scale and is provided for example purposes only. In FIG. 9, System A corresponds to a LIDAR system utilizing the process described with respect to FIG. 7 and System B corresponds to a LIDAR system utilizing the process described with respect to FIG. 8. As illustrated in FIG. 9, for the same timing of samples (e.g., capture subframes) and generation of estimated distances (e.g., TD1 and TD2), System B is capable of generating output frames at a higher frequency. Thus, the system according to embodiments described herein may be capable of having an increased frame rate without sacrificing accuracy of the result (e.g., the calculated target distance).

A second possible benefit occurs when a particular frame rate (e.g., a rate of generating output frames) is fixed. In such an environment, it can be seen that the system according the embodiment of FIG. 8 may be capable of providing a frame rate identical to that of FIG. 7 by utilizing half of the sampling. Stated another way, the embodiment of FIG. 8 may be capable of matching the precision and output frame rate of the system of FIG. 7, but with roughly half of the samples (e.g., capture subframes) of the optical signals. Thus, the system of FIG. 8 may utilize less energy due to its reduced requirements related to the generation of optical signals (and the control of light sources used for such generation). In this way, a system configured to adjust an estimated distance based on information from a prior frame (e.g., by comparing estimated distances) may represent an improved system over other techniques that may be utilized.

Though the present description has focused on LIDAR system utilizing iToF, embodiments described herein may be similarly applied to direct ToF systems as well. Referring back to FIG. 1, in a direct ToF system, an emitter 115e may emit an optical signal (e.g., a pulse of light, such as a laser) that is to be transmitted to the target 150 and reflected back to the detector array 110. A direct ToF-based LIDAR system 100 may detect a distance to the target 150 based on the round trip time from the emitter array 115, to the target 150, and back to the detector array 110 (i.e., as opposed to a phase of the return signal, as in an iToF system).

A direct ToF system may also have an unambiguous range associated with the frequency used in the acquisition. For a given operating range of the direct ToF system, a frequency may be selected such that optical signals emitted for subsequent capture subframes do not interfere with those of prior capture subframes. The unambiguous range is defined by:

$$UR = \frac{cT}{2}$$

where c is the speed of light and T is a repetition interval of the light pulses (e.g., a cycle time, 1/f). For a pulse width of 1.3 µs, the unambiguous range is approximately 200 meters. This allows for roughly 1000 light pulses in a 1 ms frame.

To achieve more samples within a given frame, the cycle time of the pulses may be decreased (e.g., the pulse frequency increased). However, when the cycle time decreases, the unambiguous range UR also decreases. Thus, conventional systems may be limited in their ability to increase the pulse frequency by the unambiguous range. As with the iToF system, targets beyond the unambiguous range will appear to "rollover." In other words, the return from the target will appear in a subsequent subframe (and interpreted as being at a closer distance). As with an iToF system, a direct ToF system having an unambiguous range of 10 meters may report a target at 11 meters as having an estimated distance of 1 meter.

To address the rollover issue, multiple frequencies may be used. For example, a plurality of capture subframes may be used, each containing a series of laser bursts at a given pulse cycle. A respective estimated distance may be determined for each of the pulse cycles. The true distance to the target may be determined based on a comparison of each of the estimated distances (e.g., via a lookup table). However, as with the iToF example discussed herein, such a process may require that a plurality of capture subframes be performed for every output frame.

The embodiments described herein may work in a similar manner with the direct ToF system as with the iToF system. For example, alternating capture cycles or alternating bursts with alternating cycle times, each alternating capture subframe utilizing one of a first and a second pulse cycle time having respective first and second unambiguous ranges may be used. A first and second estimated distance to the target may be calculated for each of the subframes. In some embodiments, a difference between the first and second estimated distances may be calculated. Based on the distance between the estimated first and second distances, a true distance to the target can be calculated by adjusting one of the estimated first and second distances. In some embodiments, the true distance to the target can be calculated by adjusting one of the estimated first and second distances based on a lookup table, where the first and second estimated distances are inputs. Thus, a direct ToF system may operate similarly to the flowchart illustrated in FIG. 8. Each of the unambiguous ranges for the first and second pulse frequencies may each be smaller than an operating distance of the LIDAR system. For example, the operating distance of the LIDAR system may be 200 meters, but the individual pulse frequencies may have smaller unambiguous ranges, for example, of 50 meters and 51 meters respectively.

Figure 10:
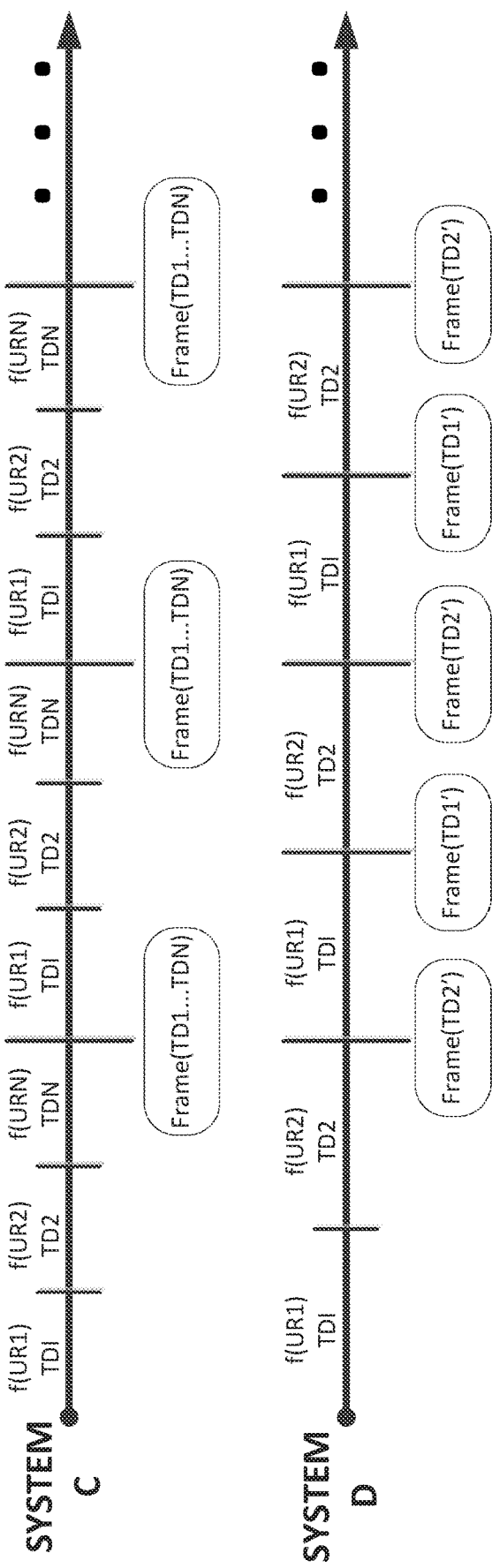
FIG. 10 illustrates a comparison of output frames for a direct ToF system utilizing embodiments described herein.

FIG. 10 illustrates a comparison of output frames for a direct ToF system utilizing embodiments described herein. FIG. 10 is not intended to be to scale and is provided for example purposes only.

As illustrated in FIG. 10, a comparative direct ToF system, System C, may utilize a plurality of pulse cycles over a plurality of capture subframes. For example, FIG. 10 illustrates a first frequency/pulse cycle having a first unambiguous range UR1, a second frequency/pulse cycle having a second unambiguous range UR2, and an Nth frequency/pulse cycle having an Nth unambiguous range URN. In a first capture subframe, light pulses having the first pulse cycle may be used to illuminate the target. Returns from each of the pulses may be analyzed to determine a first estimated distance TD1 to the target. In a second capture subframe, light pulses having the second pulse cycle may be used to illuminate the target. Returns from each of the pulses may be analyzed to determine a second estimated distance TD2 to the target. This process may be repeated up to the Nth capture subframe, in which light pulses having the Nth pulse cycle illuminate the target and an Nth estimated distance TDN is determined. The system may then compare the first through Nth estimated distances to determine a true distance to the target. For example, analysis of the plurality of estimated distances (e.g., TD1 through TDN) may determine a common distance associated with each of the estimated distances and the underlying unambiguous ranges (e.g., via a lookup table). An output frame (Frame(TD1 . . . TDN)) may then be generated having the true distance based on the first through Nth capture subframes. As with the system and method discussed with respect to FIGS. 7 and 9, System C may utilize N capture subframes to generate one output frame having the true distance to the target.

In contrast, by transmitting alternating pulses at different frequencies having different and/or alternating unambiguous ranges and detecting an estimated distance corresponding to each of the alternating frequencies, as discussed herein, an improved system may result, as illustrated by System D in FIG. 10. System D emits pulses having a first frequency corresponding to a first unambiguous range during a first capture subframe. A first estimated distance TD1 may be determined from the first capture subframe. The system emits pulses having a second frequency corresponding to a second unambiguous range during a second capture subframe, after the first capture subframe. A second estimated distance TD2 may be determined from the second capture subframe. Utilizing the method described herein (e.g., with respect to FIG. 8), a direct ToF system according to embodiments described herein may generate the true distance to the target based on the first and second estimated distances.

In some embodiments, the true distance may be generated based on the first capture subframe and the second capture subframe (e.g., a difference between the estimated distances of the two subframes and/or via a lookup table). For example, after determining the second estimated distance TD2, the second estimated distance TD2 may be adjusted to generate an adjusted second estimated distance TD2' based on a calculated difference between the first estimated distance TD1 and the second estimated distance TD2, as described herein. The true distance may be reported in an output frame (e.g., Frame(TD2')).

In some embodiments, the true distance may be generated based on the use of a lookup table using the first and second estimated distances as inputs. For example, after determining the second estimated distance TD2, the second estimated distance TD2 may be adjusted to generate an adjusted second estimated distance TD2' based on output from the lookup table. The true distance may be reported in an output frame (e.g., Frame(TD2')).

In some embodiments, the system may toggle between bursts of the first and second frequencies. In some embodiments, the first and second frequencies may each correspond to an unambiguous range that is shorter than the operating range of the system. By analyzing the estimated distances of alternating capture subframes in which the unambiguous ranges (and corresponding frequencies) are toggled, the true distance to the target can be calculated.

Comparing System C to System D, for a given duration of an output frame, System D can output more calculated distances (e.g., more output frames) for a given number of capture subframes. For example, as illustrated in FIG. 10, a System D according to embodiments described herein may be capable of providing output frames roughly on a 1 to 1 basis during steady-state operation, as compared to a 1-to-N basis of System C. This may allow for the frame rate of the system to be increased, or for a more efficient use of power for a given frame rate. Therefore, System D, operating according to embodiments described herein, can achieve more data and/or higher power efficiency without sacrificing accuracy.

Systems and methods such as those described herein have numerous advantages over conventional systems. For example, as discussed herein, the use of different frequencies and/or pairs of frequencies over different acquisition subframes may allow for a more precise determination of a target's location without losing optical energy or silicon real-estate. As discussed herein, conventional systems utilizing a single frequency or pair of frequencies may be unable to deduce the true location of a target due to range rollover unless they use lower modulation frequencies, which results in larger range error. Such conventional systems often have to resort to the use of additional subframes solely for resolving the unambiguous range of the target. These additional subframes may not provide data (e.g., points for a point cloud) but may be used solely or primarily for determining an unambiguous distance. In the embodiments of the present invention, the use of a plurality of frequency pairs allows for data to be continuously gathered, with differences between the gathered data used to precisely locate the target without having to resort to the use of additional subframes to resolve the unambiguous range issues. As a result, embodiments of the present invention may be more efficient and/or more accurate than conventional systems. Though embodiments described herein may experience a delay of 1 frame, e.g., 30 ms, before an estimated distance is corrected, this delay can be tolerated by most systems, especially when such rollover events are relatively rare. Embodiments described herein may look at the last N subframes (N being the number of unique laser cycles or laser bursts) and may reports the true distance every subframe (by utilizing the subframes from prior output frames) rather than every N subframes. In some embodiments, the embodiments described herein may maintain a frame update rate (how often a target's range is reported) but may utilize a significantly lower system power (on the order of nominal_power/sqrt(N)) because the embodiments described herein may have N times longer time to acquire the information from each pulse burst.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent.

Aspects of the present inventive concepts are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present inventive concepts. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The example embodiments are mainly described in terms of particular methods and devices provided in particular implementations. However, the methods and devices may operate effectively in other implementations. Phrases such as "some embodiments", "one embodiment," and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts. The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or subcombination.

Although the invention has been described herein with reference to various embodiments, it will be appreciated that further variations and modifications may be made within the scope and spirit of the principles of the invention. Although specific terms are employed, they are used in a generic and descriptive sense only and not for purposes of limitation. The following claim is provided to ensure that the present application meets al statutory requirements as a priority application in all jurisdictions and shall not be construed as setting forth the scope of the present invention.

The invention claimed is:

1. A method of operating a time of flight system comprising:
   detecting first optical signals comprising a first frequency having a first unambiguous range, the first optical signals reflected from a target;
   processing the first optical signals to determine a first estimated distance to the target; and
   generating an output frame comprising a corroborated distance to the target based on the first estimated distance and a second estimated distance to the target, wherein the second estimated distance was used to generate a previous output frame,
   wherein the second estimated distance is generated by processing second optical signals comprising a second frequency having a second unambiguous range, different from the first unambiguous range, and
   wherein determining the corroborated distance to the target comprises comparing a calculated difference between the first estimated distance to the target and the second estimated distance to the target to a calculated difference between the first unambiguous range and the second unambiguous range.

2. The method of claim 1, wherein the second estimated distance is generated by processing second optical signals comprising a second frequency having a second unambiguous range, different from the first unambiguous range.

3. The method of claim 2, wherein the previous output frame is generated after the processing of the second optical signals, and
   wherein the first optical signals are processed after generating the previous output frame.

4. The method of claim 2, wherein the first optical signals are processed during a first subframe of the output frame, and
   wherein the second optical signals are processed during a second subframe of the previous output frame, prior to the first subframe.

5. The method of claim 1, wherein determining the true corroborated distance to the target comprises adjusting the first estimated distance based on a calculated difference between the first estimated distance and the second estimated distance.

6. The method of claim 1, wherein the first estimated distance to the target is determined using first phase shifts in the first optical signals.

7. The method of claim 2, wherein the first optical signals and the second optical signals are detected by individual detector elements of a detector array.

8. The method of claim 1, wherein the first frequency is a combination of a plurality of frequencies, the combination of the plurality of frequencies having the first unambiguous range.

9. The method of claim 1, wherein the target is one of a plurality of targets, and
   wherein the first estimated distance to the target is one of an array of estimated distances to the plurality of targets generated during a first subframe.

10. A Time of Flight (ToF) system comprising:
    an emitter array comprising a first plurality of emitters configured to emit first optical signals and a second plurality of emitters configured to emit second optical signals;
    a detector array that is configured to:
       detect the first optical signals comprising a first frequency having a first unambiguous range, the first optical signals reflected from a target;
       detect the second optical signals comprising a second frequency having a second unambiguous range, different from the first unambiguous range; and
    a control circuit configured to:
       process the first optical signals to determine a first estimated distance to the target;
       process the second optical signals to determine a second estimated distance to the target; and generate an output frame comprising a corroborated distance to the target based on the first estimated distance and a second estimated distance to the target, wherein the second estimated distance was used to generate a previous output frame.

11. The ToF system of claim 10, wherein the previous output frame is generated after the processing of the second optical signals, and
wherein the first optical signals are processed after generating the previous output frame.

12. The ToF system of claim 10, wherein determining the corroborated distance to the target comprises adjusting the first estimated distance based on a calculated difference between the first estimated distance and the second estimated distance.

13. The ToF system of claim 10, wherein the true corroborated distance to the target is a first sum of the first estimated distance and a first multiple of the first unambiguous range and/or a second sum of the second estimated distance and a second multiple of the second unambiguous range, and
wherein responsive to determining that subtracting the second estimated distance from the first estimated distance results in a positive number, the second multiple is calculated by the equation $(TD1-TD2))/(UR2-UR1)$ where UR1 is the first unambiguous range, UR2 is the second unambiguous range, TD1 is the first estimated distance, and TD2 is the second estimated distance.

14. The ToF system of claim 10, wherein the control circuit is further configured to determine the first estimated distance to the target using first phase shifts in the first optical signals.

15. The ToF system of claim 10, wherein the first frequency is a combination of a plurality of frequencies, the combination of the plurality of frequencies having the first unambiguous range.

16. The ToF system of claim 10, wherein the target is one of a plurality of targets, and
wherein the first estimated distance to the target is one of an array of estimated distances to the plurality of targets generated during a first subframe.

17. A control circuit for determining a distance to a target, the control circuit configured to perform operations comprising:
controlling transmission of first optical signals at a first modulation frequency having a first unambiguous range in a first subframe to obtain a first estimated distance to a target; and
generating an output frame comprising a corroborated distance to the target based on the first estimated distance and a second estimated distance to the target, wherein the second estimated distance was used to generate a previous output frame,
wherein the second estimated distance is generated by processing second optical signals comprising a second frequency having a second unambiguous range, different from the first unambiguous range, and
wherein determining the corroborated distance to the target comprises comparing a calculated difference between the first estimated distance to the target and the second estimated distance to the target to a calculated difference between the first unambiguous range and the second unambiguous range.

18. The control circuit of claim 17, wherein the previous output frame is generated after the processing of the second optical signals, and
wherein the first optical signals are processed after generating the previous output frame.

19. The control circuit of claim 17, wherein the control circuit is further configured to determine the first estimated distance to the target based on a calculated duration between the transmission of the first optical signals and a detection of the first optical signals by a detector after being reflected by the target.

20. A method of operating a time of flight system comprising:
emitting, by an emitter array comprising a first plurality of emitters configured to emit first optical signals and a second plurality of emitters configured to emit second optical signals, the first optical signals and the second optical signals;
detecting the first optical signals comprising a first frequency having a first unambiguous range, the first optical signals reflected from a target;
processing the first optical signals to determine a first estimated distance to the target;
generating a first output frame comprising a first corroborated distance based on the first estimated distance;
detecting the second optical signals comprising a second frequency having a second unambiguous range, different from the first unambiguous range, the second optical signals reflected from the target;
processing the second optical signals to determine a second estimated distance to the target; and
generating a second output frame comprising a second corroborated distance based on the first estimated distance and the second estimated distance to the target.

21. The method of claim 20, wherein generating the second output frame comprises generating the second corroborated distance by adjusting the second estimated distance to the target based on a comparison of the second estimated distance to the first estimated distance.

* * * * *